United States Patent [19]
Lovelady et al.

[11] Patent Number: 5,335,292
[45] Date of Patent: Aug. 2, 1994

[54] DOCUMENT PROCESSING SYSTEM AND METHOD

[75] Inventors: Kenneth T. Lovelady; Medford D. Sanner, both of Irving, Tex.

[73] Assignee: Recognition International Inc., Dallas, Tex.

[21] Appl. No.: 651,581

[22] Filed: Feb. 6, 1991

Related U.S. Application Data

[63] Continuation-in-part of Ser. No. 289,596, Dec. 21, 1988, Pat. No. 5,003,613.

[51] Int. Cl.⁵ ............................................. G06K 9/00
[52] U.S. Cl. ........................................ 382/17; 382/61
[58] Field of Search ...................... 382/17, 61; 358/80

[56] References Cited

U.S. PATENT DOCUMENTS

| Re. 29,104 | 1/1977 | Shepard | 382/17 |
|---|---|---|---|
| 3,444,517 | 5/1969 | Rabinow | 382/17 |
| 4,488,245 | 12/1984 | Dalke et al. | 358/80 |
| 4,547,897 | 10/1985 | Peterson | 382/17 |
| 4,700,399 | 10/1987 | Yoshida | 382/17 |
| 4,941,184 | 7/1990 | Sato | 382/17 |
| 5,010,580 | 4/1991 | Vincent et al. | 382/17 |
| 5,014,329 | 5/1991 | Rudak | 382/17 |

Primary Examiner—Leo H. Boudreau
Attorney, Agent, or Firm—Ross, Howison, Clapp & Korn

[57] ABSTRACT

A document processing system for processing documents having data printed thereon including markings visible to the eye, but which are not to be read by the system and characters which are to be read by the system includes structure for scanning a document for capturing the color image of the document being processed and for generating a plurality of colored picture elements. Circuity is provided for identifying colors included within the core area and edge of the markings. The colors of the picture elements of the core area and edge of the markings are converted to the color of the background of the document thereby generating a filtered image of the document. An optical character recognition unit is provided for receiving the filtered image of the document representing character information only and for identifying the characters appearing on the document from the filtered image, such that the markings and the background surrounding a character are not distinguishable by the optical character recognition unit.

20 Claims, 7 Drawing Sheets

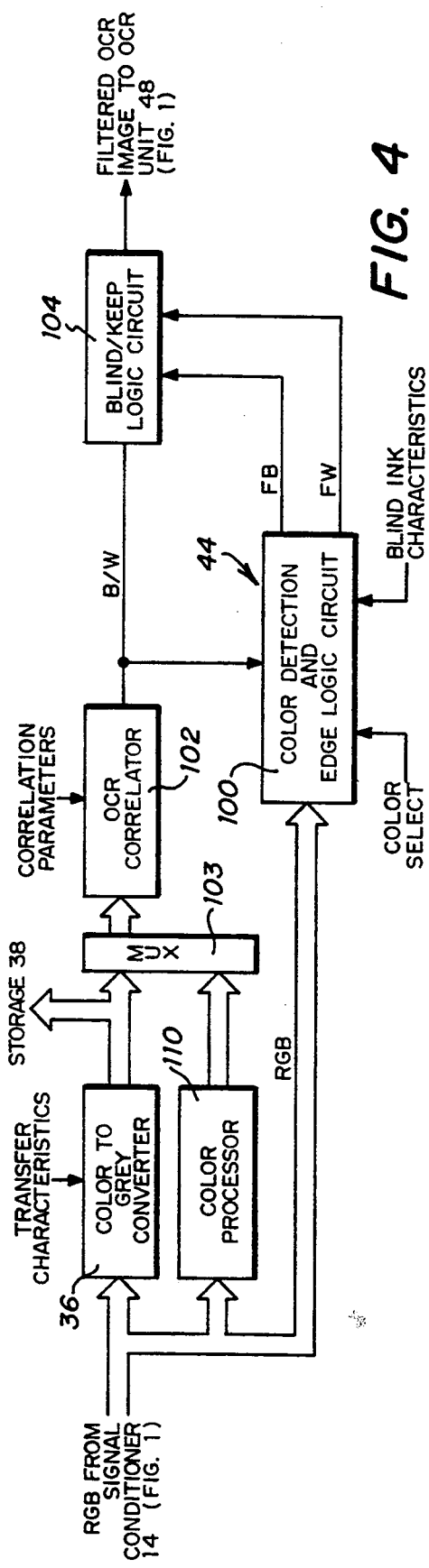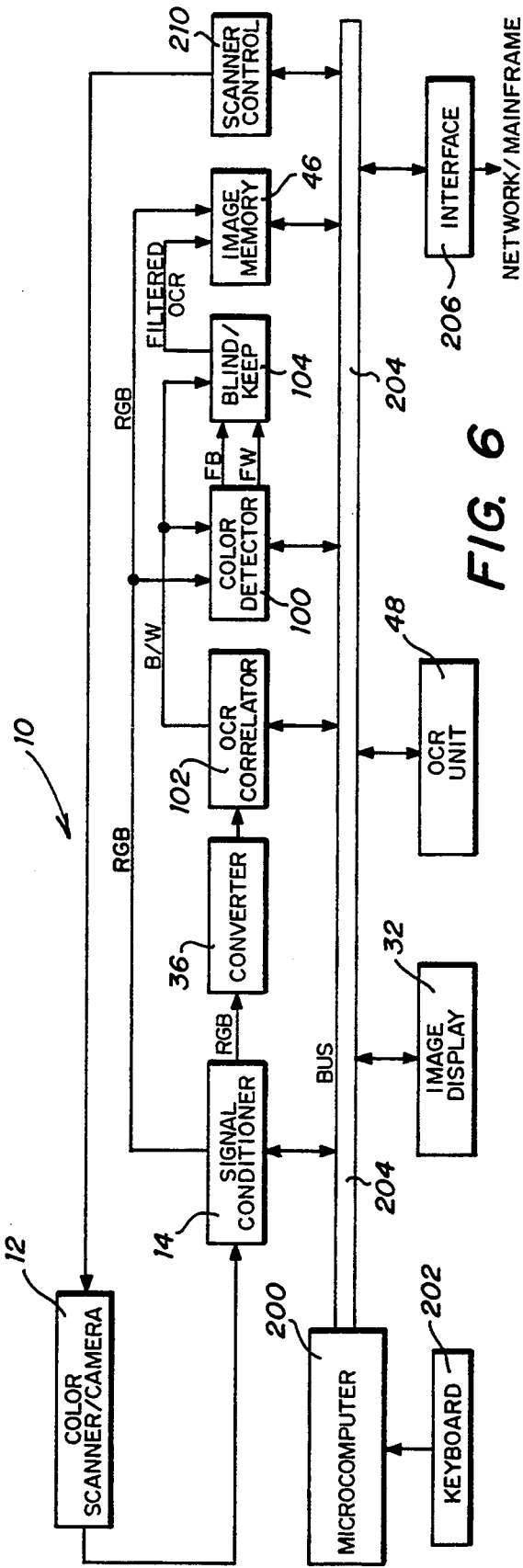

DOCUMENT PROCESSING SYSTEM AND METHOD

RELATED APPLICATION

This application is a continuation-in-part of copending application Ser. No. 289,596 filed Dec. 21, 1988, and entitled "Document Processing System and Method" and now U.S. Pat. No. 5,003,613.

TECHNICAL FIELD

This invention relates to document processing systems and methods for processing documents, and more particularly, to an electronic color filter for an optical character recognition system in which character location markings do not interfere with the reading of the characters.

BACKGROUND OF THE INVENTION

Many documents carry informational markings and pre-printed character location markings visible to the eye which assist the document preparer in completing required information on the document. Many pre-printed forms utilize these pre-printed character location markings for confining characters to specific locations and sizes in order to assist a character reader in identifying the characters added to the document, but the markings themselves are not intended to be read by the optical character reader.

Various commercially available optical character recognition devices function well in identifying characters which are clearly separated from extraneous lines, dots, printed material, and other visible matter which may be pre-printed on the document and which are not intended to be read by the optical character recognition device. Such OCR devices do not experience great difficulty in identifying a single character or line of characters on an otherwise clear surface. Similarly, optical character recognition devices experience little difficulty in identifying all of the characters on an entire page, provided that there are no extraneous markings on the page and that the characters are properly registered. On some documents; however, it is essential that characters be printed on forms which are pre-printed in a manner such that writing areas are separated by visible lines or other marks. Such lines are necessary for separating the data in an orderly fashion. Many government forms such as income tax forms, census forms, social security forms, and others, have boxes within which to print information. It has been found that machine identification of hand-printed characters is assisted if visible constraint marks on the document are pre-printed to assist the preparer of the document. The desirability of the pre-printed character location markings can be balanced against the problems of optical character recognition devices in recognizing characters on documents containing such markings. The OCR devices must rely on light reflectance from the character-background and absorption from the characters themselves to distinguish between true characters which are to be identified by the OCR device, and other visible markings adjacent to the character, touching or passing through the characters or surrounding the characters which are not to be identified.

Document processing systems have been proposed in order to allow the OCR device to distinguish between the pre-printed character location markings and the actual characters to be read. One such system is described in U.S. Pat. No. 3,444,517, issued to J. Rabinow on May 13, 1969 and entitled "Optical Reading Machine and Specially Prepared Documents Therefor". This optical reading machine utilizes pre-printed documents in which the character location markings are printed in fluorescent material. The document is subjected to exciting radiation during the reading cycle such that the true characters will reflect very little of the radiations, but the marks will be energized in a manner to emit energy to which a scanner photocell is sensitive. Although these marks under ordinary light appear to be visible, when energized, in cooperation with their radiation source, these marks emit energy in such a way that the scanner photocell provides output signals as though the marks did not exist or that the marks are brighter than the background or the characters to be read. Therefore the entire black-to-white range for the device examining the characters is unaffected.

Many documents are pre-printed in a variety of colors in which the background as well as the character location markings may be printed with different colored inks. In order to eliminate the pre-printed color location markings which are printed with colored inks, various optical filters and lenses have been utilized in order to prevent this pre-printed information captured from the document from being presented to the optical character recognition device such that the optical character recognition device is "blind" to these colored inks. Color-sensitive photocells are utilized in the character recognition device in order to filter out the pre-printed character location pixel information and only present the true character pixel information to the optical character recognition device. Such systems require multiple optical filters which must be interchanged depending upon the colors of the ink utilized on the pre-printed form.

Another system proposed in order to prevent interference of pre-printed character location markings from the actual characters to be read on a document is described in U.S. Pat. No. 29,104, issued to David H. Shepard on Jan. 4, 1977 and entitled "Method of Scanning Documents to Read Characters Thereon Without Interference From Visible Marks on the Document Which Are Not To Be Read By the Scanner". This system utilizes a laser scanner unit adapted to scan a document. The color of the markings on the documents must be matched to the wavelength of the laser so that the light reflected from the markings has the same intensity as the light reflected from the document background. The pre-printed character location markings are "blinded" and do not interfere with the reading of the characters. Since the color of the pre-printed character location markings must be selected to match the wavelength of the laser, such a system does not have the ability to easily adapt to different colored pre-printed markings on numerous documents as well as to different colored pre-printed character location markings on the same document to be processed and read by an optical character recognition device.

Three dimensional color detection and modification systems have been used in a variety of applications. These applications include: the printing industry for pre-press color correction; in machine vision application to discriminate between objects; and in general color image processing, such as, for example, LANDSAT or medical imaging, for discrimination of important features. In general these systems utilize RGB image scanners and cameras, and convert RGB space to intensity/orthogonal chroma space (such as Y, I, Q or L, a, b) and/or hue, saturation, intensity space for the detection process. All three color spaces/scales are three dimensional.

Although existing three dimensional color detection/modification systems exist, these systems are inadequate for processing images for optical character recognition purposes, and therefore such systems do not function well for color filtering. In a scanning system with finite pixel size and conventional optics performance, enumerable pixel color values can be created at color transitions. The color values progress along a vector between the two colors, passing through the color space of other valid, solid (non-edge) colors. Existing color processing methods may "blind" the valid ink, but leave the transition values which may not be objectionable to the human eye, but which do interfere with the optical character recognition process of character location and recognition. Additionally, when the "blind" ink color is blinded, it should be changed to the color of the regional background which may or may not be a fixed color. The background can be affected by soiling, different characteristics of paper, and ink variations due to the printing process. Thus, existing three dimensional color detection and modification systems do not function to fully "blind" unwanted colored markings which interfere with character recognition.

A need has thus arisen for a document processing system for processing documents having character location markings which are visible to the eye, but which are "blind" to an optical character recognition device. Such a document processing system must be capable of processing documents having numerous colors without mechanically changing optical filters as well as eliminating different colored "blind" inks on the same document. Such a document processing system further requires the ability to operate with specially prepared forms, documents, or other surfaces on which characters to be read by a character recognition device are formed in a manner such that the marks other than the true characters are rendered indistinguishable by the optical character recognition device from the background reflectance of the surface.

A need has further arisen for a document processing system for minimizing the interference between a multiplicity of colors produced in a transition between colors, and valid writing instrument colors which may have the same three dimensional color coordinates. Additionally, a need has arisen for a document processing system having the ability to designate colors which are to be retained and not blinded. A need has further arisen for a document processing system for selecting multiple blind inks and multiple keeper inks which can be selected individually or used in various combinations which appear on the same document.

SUMMARY OF THE INVENTION

In accordance with the present invention, a document processing system for processing documents having data printed thereon including markings visible to the eye, but which are not to be read by the system and characters which are to be read by the system is provided. The system includes structure for scanning a document for capturing the color image of the document being processed and generating a plurality of colored picture elements. Circuity is provided for identifying colors included within the core area and edge of the markings. The colors of the picture elements of the core area and edge of the markings are converted to the color of the background of the document thereby generating a filtered image of the document. An optical character recognition unit is provided for receiving the filtered image of the document representing character information only and for identifying the characters appearing on the document from the filtered image, such that the markings and the background surrounding a character are not distinguishable by the optical character recognition unit.

In accordance with another aspect of the present invention, a document processing system for processing documents having data printed thereon including markings visible to the eye, but which are not to be read by the system and characters which are to be read by the system is provided. The system includes structure for scanning a document for capturing the color image of the document being processed and generating a plurality of colored picture elements. Circuity is provided for identifying the color of characters appearing on the document. All colors of markings appearing on the document are converted to the color of the background of the document except for the identified color of the characters appearing on the document, thereby generating a filtered image of the document. An optical character recognition unit is provided for receiving the filtered image of the document representing character information only and for identifying the characters appearing on the document from the filtered image, such that the markings and the background surrounding a character are not distinguishable by the optical character recognition unit.

BRIEF DESCRIPTION OF DRAWINGS

For a more complete understanding of the present invention and for further advantages thereof, reference is now made to the following Description of the Preferred Embodiments taken in conjunction with the accompanying Drawings in which:

FIG. 4 is a detailed block diagram of the color processor block of FIG. 1;

FIG. 6 is a detailed block diagram of an optical character recognition system utilizing the present invention;

DESCRIPTION OF THE PREFERRED EMBODIMENTS

Figure 1:
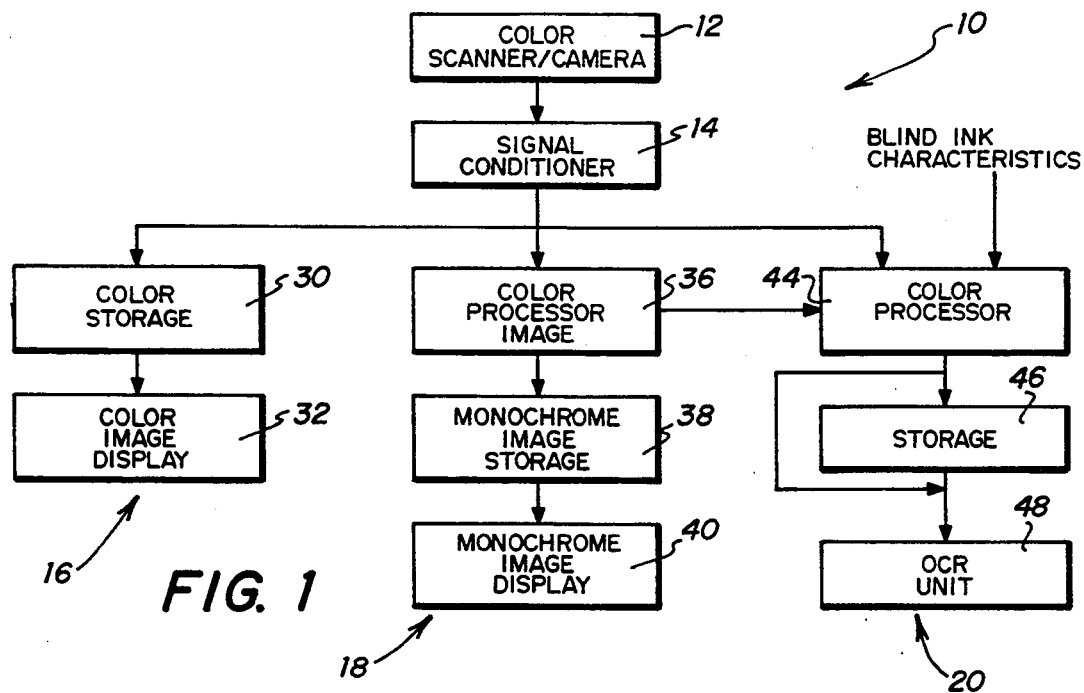
FIG. 1 is a block diagram of the present document processing system.

Referring to FIG. 1, the present document processing system is generally identified by the numeral 10. Document processing system 10 is utilized for processing documents of a variety of types in which pre-printed information and character location markings visible to the eye appear. These markings assist the preparer of a document in identifying information and location of data and in placing and forming characters to be added to the document. The markings may include lines, boxes, dots, and other guides which are not intended to be read by the optical character recognition device processing the document. These markings are typically printed in "blind" ink, reflective inks or drop-out colors and although they are visible to the eye, they need to be invisible to the character recognition device. These markings may be pre-printed in any color ink and the present system 10 can be utilized with documents having different colored inks appearing on the same document.

Most optical character recognition devices are required to identify characters printed upon an optically contrasting surface. The usual requirement is that the characters be dark and the background be light so that the black-to-white ratio is as large as possible. Under ordinary illumination, the characters are as light-absorbent as possible, while the background area is as light-reflective as possible. Poor or degraded OCR print may have print contrast ratios as low as the blind ink or reflectances as high as the blind ink, and therefore, the OCR print cannot be thresholded without interference if the blind ink is not removed. Difficulty is also experienced in these optical character recognition devices as previously stated because of the requirement that there be extraneous printed material on the same surface as the characters which are to be identified. As used herein, markings are visible to the eye and may be in the form of lines, boxes surrounding a character, written instructions on the document, and other markings, pre-printed or non pre-printed, which adversely affect the operation of the optical character recognition device. These markings will be discussed in connection with FIG. 2.

The present document processing system 10 utilizes a color scanner/camera 12 for capturing, in color, the image of the document to be processed. Color scanner/camera 12 utilizes a three-color image sensor which scans the document on a point-by-point basis and produces picture element (pixel) video signals which are applied to a signal conditioner 14. Color scanner/camera 12 may include, for example, a model TCD 116 color array, manufactured and sold by Toshiba Corporation of America, which produces 400 color points per inch with red, green, blue (RGB) output channels.

The output of color scanner/camera 12 is amplified, DC restored and the multiple outputs of color scanner/camera 12 are balanced to prevent seams between segments utilizing a signal conditioner 14. A gain correction is applied to each pixel by signal conditioner 14 in order to normalize each cell to the same sensitivity such that the R, G, B color channels are all normalized to "1" when viewing a calibrated white surface, thereby maintaining the effect of an "equal energy" white illuminator.

The R,G,B, output of signal conditioner 14 is simultaneously applied to three processing channels of document processing system 10. The three channels include a color image channel 16; monochrome image channel 18 and optical character recognition (OCR) channel 20. Each channel, 16, 18 and 20 functions independently of the other and either or both of channels 16 and 18 may be utilized with document processing system 10.

The output of signal conditioner 14 is applied to a color storage unit 30 within channel 16 of document processing system 10. The output of color storage unit 30 is applied to a color image display 32 which may, for example, provide a 1024 by 1024 pixel image at 24 bits per pixel. The image displayed on color image display 32 represents the color image of the document captured by color scanner/camera 12, and may be used to assist an operator of document processing system 10 to identify characters which could not be recognized by the optical character recognition unit of the present invention.

The output of signal conditioner 14 is also applied to a color processor image unit 36 within channel 18 of document processing system 10. Color processor image 36 functions to convert the R, G, B channels of color-scanner/camera 12 into a monochrome signal which represents the image of the document captured by color scanner/camera 12 according to its brightness. The proportions of each of the color signals from color scanner/camera 12 that are used to form the luminance signal are in the following proportions: 59% of the green signal, 30% of the red signal, and 11% of the blue signal. A system for forming the luminance signal is described in a publication entitled "Color TV Training Manual" published by Howard W. Sams and Co., Inc., the Bobbs-Merrill Co., Inc., Indianapolis, Ind., 4th Printing, 1973, Pages 34–37, which description is incorporated herein by reference. The output of color processor image unit 36 is applied to monochrome image storage unit 38 which output is applied to a monochrome image display 40. Display 40 displays to the operator of document processing system 10 the image of the document captured by color scanner/camera 12 in a black/white or gray scale monochrome image. The monochrome image of the document displayed by monochrome image display 40 may be utilized in a manner similar to the display provided by color image display 32 by the operator of the present document processing system 10.

The output of signal conditioner 14 is also applied to channel 20 of the present document processing system 10, and more specifically to a color processor unit 44 to be further described with reference to FIG. 4. Color processor unit 44 also receives an input provided by the system microcomputer (FIG. 6) or by an operator indicating the blind ink characteristics, and more specifically, the hue of the blind ink. Color processor unit 44 functions to electronically filter the pre-printed markings from the data captured by color scanner/camera 12 for presentation to OCR unit 48 for character recognition. The output of color processor unit 44 may be applied directly to OCR unit 48 or stored in a storage unit 46 for subsequent application to OCR unit 48.

Color processor unit 44 may comprise, for example, the three-dimensional color detection and modification system described in U.S. Pat. No. 4,488,245, which issued to G. B. Dalke et al. on Dec. 11, 1984 and which is entitled, "Method and Means for Color Detection and Modification". The specification and drawings of the '245 patent are incorporated herein by reference.

Color processor unit 44 functions as an electronic filter to subtract a percentage of the complimentary color of the markings from the color channel (RGB) that best matches the hue of the markings. The result is that the background intensity is "seen" as the same intensity as the markings, such that the markings become blind to the optical character recognition unit 48. In this embodiment, color process unit 44 may include, for example, a look-up table for generating the complimentary hue based upon an input of the blind ink characteristics. The hue of the blind ink may be preset by operation of the system software depending upon the particular form or document being processed, an operator input switch or operator menu selection or as described in the '245 patent.

Color processor unit 44 may also function to subtract a percentage of the complimentary color from the blind ink channel or plane. The amount to be subtracted is the difference between: 1) the blind ink value in the blind ink channel comprising the image of the pre-printed markings, and 2) the white or background color in the blind ink channel representing the area surrounding a character to be recognized. Since there is no blind ink energy in the complement color, nothing is subtracted from the blind ink channel while processing blind ink pixels. When reflectance is from the background around a character however, a complement output is maximum and the subtraction reduces the value of the white background pixels down to the value of the blind ink reflectance or energy thereby making white and the blind ink equal, resulting in zero contrast. When a pixel is black or a non-blind ink color representing a character to be recognized, the contrast is enhanced slightly depending upon the intensity and hue of the color. Color processor unit 44 performs the following arithmetic operations for red, blue and green blind inks used to print the pre-printed character location markings:

$$R = \frac{1}{1-\%}(BIH - \% \, CH) \quad (1)$$

where:
R is the blinded result; (output of color processor unit 44)
BIH is the blind ink hue;
CH is the complement of the blind ink hue;
% is 1—reflectance of the blind ink in the hue channel; and $\frac{1}{1-\%}$ is the rescaling factor.

The resulting pixel amplitude or brightness is rescaled back to 100% utilizing the factor $\frac{1}{1-\%}$.

The complement of the blind ink colors for green is magenta, which is red plus blue divided by 2; for red it is cyan, which is blue plus green divided by 2; and for blue it is yellow, which is red plus green divided by 2. The pre-printed markings could be magenta, cyan, and yellow in which case the complements are red, blue, and green, respectively. In general, the best complementary color to use is the channel or combination of channels that has the least amount of blind ink energy.

The output of color processor unit 44 is applied to an optical character recognition unit 48. This output represents only pixels representing the data content of characters to be recognized and the background surrounding such characters with the markings having been eliminated by operation of color processor unit 44. OCR unit 48 may comprise, for example, a system described in U.S. Pat. No. 3,761,876, which issued to L. Flaherty, et al. on Sep. 25, 1973 which is entitled "Recognition Unit for Optical Character Reading System" which description and drawings are incorporated herein by reference.

Figure 2:
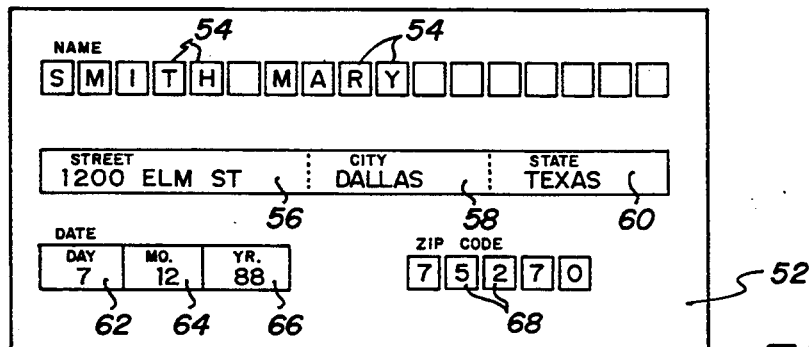
FIG. 2 is an illustration of a document processed by the present document processing system.

Referring now simultaneously to FIGS. 1 and 2, a document 52 (FIG. 2) is illustrated which is representative of documents processed by the pre-printed character location markings as well as written instructions which interfere with the operation of OCR unit 48 during character recognition. Document 52 includes pre-printed character location markings in the form of boxes 54 which are used by the individual completing document 52 to locate and form the characters comprising the name "SMITH MARY". Also indicated on document 52 is a designated area for the address of the individual completing document 52, including a field 56 for the street, field 58 for the city and field 60 for the state. The pre-printed markings include the words "Street", "City", and "State" in addition to the dotted lines separating fields 56, 58 and 60. Further included on document 52 is an area for completing the date which includes fields 62, 64 and 66 representing the day, month and year. Instructional information is printed within each field representing "DAY"; "MO."; "YR." Finally, a portion of document 52 requests completion of the individual's zip code and includes boxes 68 for locating the numerals of the zip code.

Figure 3:
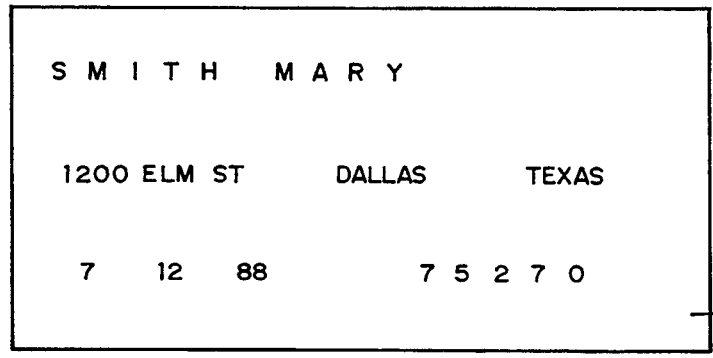
FIG. 3 is an illustration of the data from the document shown in FIG. 2 that is presented to the optical character recognition unit of the present document processing system.

FIG. 3 illustrates the data of document 52 after document 52 has been processed by color processor unit 44. The markings have been "eliminated" and are not presented to OCR unit 48. All lines, boxes surrounding characters, and written instructions on document 52 which adversely affect the operation of OCR unit 48 have been electronically color filtered and are not presented to OCR unit 48. Displays 32 and 40 of document processing system 10 will display to the operator of system 10 the image of document 52 in color or in monochrome, respectively, as represented in FIG. 2.

The markings appearing in a document include a "core" area or the interior of the marking. The color of the core area is the basic color of the blind ink. The boundary surrounding the core area of the marking is the "edge". The edge includes transition colors associated with the color of the core. Merely blinding the core color may not, however, completely blind the marking since the edge having additional colors may remain. Therefore the present invention operates to blind a cluster of colors representing the core and edge transition colors to completely blind markings. Since it is possible for an edge of a marking to also have some colors that are present in a character, the present system also detects the edges of markings to ensure that only the identified color present in markings are blinded so that no blinding of portions of characters takes place.

Referring now to FIG. 4, a more detailed block diagram of block 44, color processor, of FIG. 1 in accordance with the present invention will be described. The output of signal conditioner 14 representing conditioned, digitized, color video from color scanner/camera 12 is applied to color to gray converter 36 (color processor image block 36, FIG. 1) and to color detection and edge logic circuit 100. Color to gray converter 36 functions as previously described with respect to FIG. 1. The luminance signal is a monochrome, approximately phototopic representation of the image which is a rendition pleasing to the human eye. Thus, the elements the human eye sees as contrasting, the correlator 102 which receives the brightness signal (I) will also see as contrasting. Should the transfer function of converter 36 fail to provide sufficient contrast for particular color combinations, the coefficients of the transfer function, input to converter 36 via the transfer characteristics signal, may be changed to give the desired effect. Converter 36 includes a lookup table memory. The input to converter 36 may comprise for example, a fifteen bit color signal which is converted to a four bit digital value applied to correlator 102 through a multiplexer 103.

Correlator 102 functions to buffer as many as, for example, 14 scans of gray video, to compute the mean value of the cells surrounding the current pixel up to a 14 by 14 matrix, and thresholds the center pixel value based upon a comparison with the average cell value in the area. Correlator 102 may include a correlator as described in U.S. Pat. Nos. 4,162,481 and 3,761,876, the descriptions and drawings of which are incorporated by reference. Correlator 102 functions to accentuate edges, and therefore correlator 102 functions also as an edge detector "tuned" for OCR characters. The correlation parameters are input to correlator 102 to determine the matrix size for the area average and the threshold sensitivity. The output of correlator 102 is thresholded black/white video which is applied to blind/keep logic circuit 104 as both the image and as edge information.

The conditioned RGB signal from signal conditioner 14 is also applied to color detection and edge logic circuit 100 which also receives the black/white video signal generated by correlator 102, a color select signal, and blind ink characteristics signal. Color detection and edge logic circuit 100 generates the force-black and force-white signals which are applied to circuit 104. The force-black and force-white signals are only generated when a valid edge is present as determined by circuit 100 which generates the EDGE signal (FIG. 5) to thereby prevent a valid, solid color (no edge) from being modified. This operation will be described further in connection with FIG. 8. The output of circuit 104 generates the filtered OCR image which is applied to OCR unit 48 (FIG. 1).

The output of signal conditioner 14 is also applied to a color processor 110 which operates to perform a color subtraction function as previously described with respect to color processor 44 (FIG. 1). Either the output of converter 36 or the output of processor 110 may be applied to correlator 102.

Figure 5:
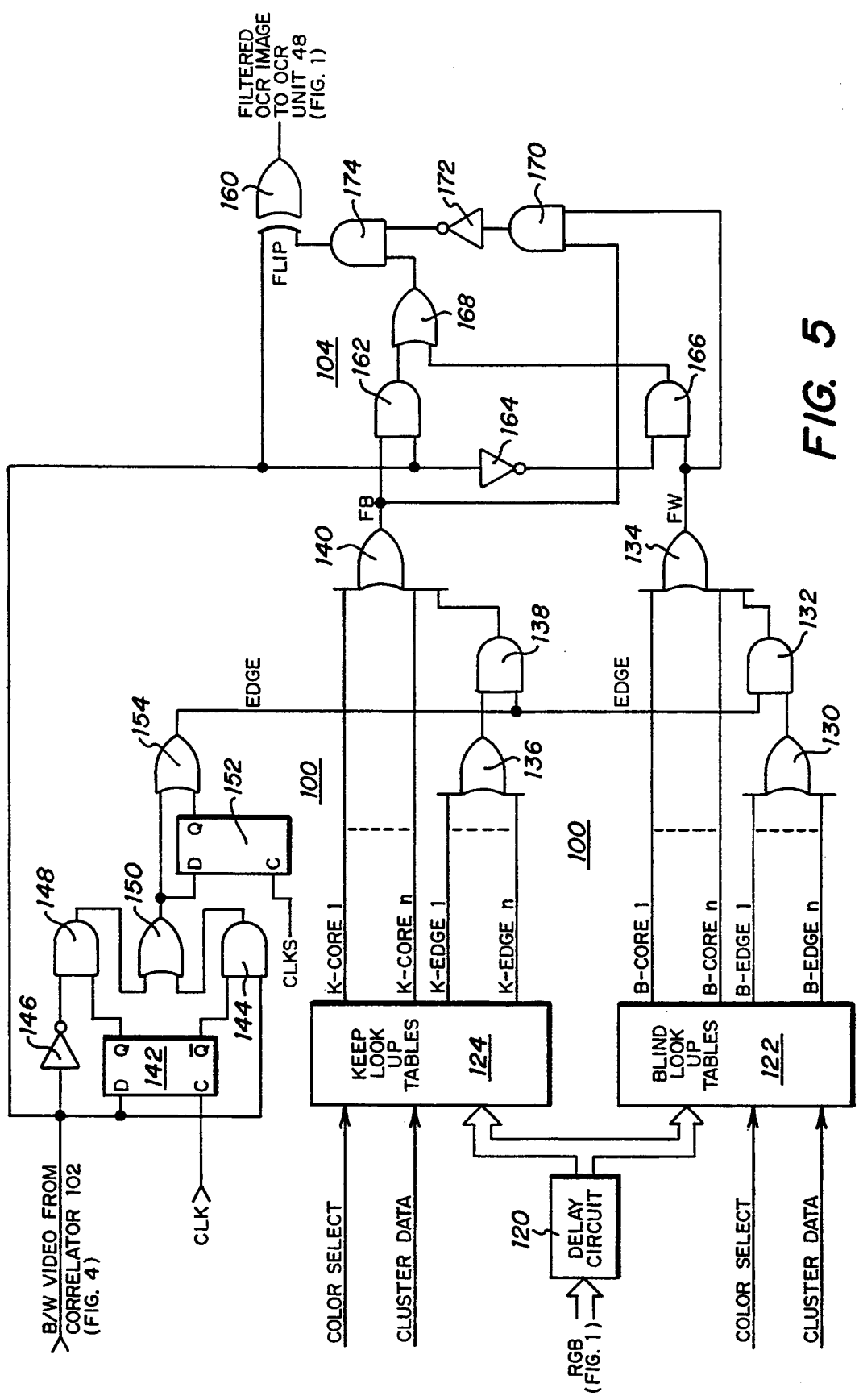
FIG. 5 is a schematic logic diagram illustrating the color detection and edge logic and blind/keep logic blocks of FIG. 4.

Referring now to FIG. 5, circuit 100 will now be described. The RGB video is initially applied to a delay circuit 120 such that the RGB video is delayed with respect to correlated video from correlator 102 so that the edge information is available for the pixel just before and just after the edge. The output of delay circuit 120 is applied to a blind color lookup table 122 and a keep color lookup table 124 where each pixel is tested to determine if a pixel is a blind core (B-CORE) or blind edge (B-EDGE) color at lookup table 122, or a keep core (K-CORE) or a keep edge (K-EDGE) color at lookup table 124. As illustrated in FIG. 5, each lookup table 122 and 124 has dedicated output lines. The active colors are selected/deselected and the color clusters are loaded from the application program via a microprocessor bus (FIG. 6) to lookup tables 122 and 124.

The output of lookup tables 122 and 124 are applied to combinational logic. The BLIND edge pixel clusters are OR'ed together in a gate 130. The output of gate 130 is combined with the edge function in a gate 132. The output of gate 132 is OR'ed with the core clusters to be blinded in a gate 134 whose output generates the force-white signal which is applied to the blind/keep logic 104 (FIG. 4).

The KEEP clusters generated by lookup table 124 are similarly combined. The KEEP edge clusters are OR'ed together in a gate 136. The output of gate 136 is combined with the edge function in a gate 138. The output of gate 138 is OR'ed with the KEEP core clusters in a gate 140 to generate the force-black signal output which is applied to blind/keep logic 104 (FIG. 4).

The EDGE signal is true for the pixel before a transition and the pixel after a transition. The input signal from correlator 102 (FIG. 4) is applied to a transition-detection delay flip-flop 142, a transition-detection gate 144 and an inverter 146. The output of inverter 146 is applied to a gate 148 which also receives the output of flip-flop 142. Gates 144 and 148 detect high-to-low and low-to-high transitions, respectively, when the input to flip-flop 142 is different than the output of flip-flop 142, one pixel later. The output of gate 148 and the output of gate 144 are combined in an OR gate 150. The output of gate 150 is applied to a flip-flop 152 whose input and output are combined in an OR gate 154 to generate the EDGE function. The EDGE function is a two pixel wide pulse centered on the transition. The edge signal is applied to gates 132 and 138 to enable color edge clusters for the blind/keep process.

The blind/keep logic circuit 104 (FIG. 4) receives the black/white video signal from correlator 102 and the force-white signal from gate 134 and the force-black signal from gate 140. The black/white video from correlator 102 passes through an exclusive OR gate 160 to OCR unit 48 (FIG. 1) either unchanged or inverted according to the state of the FLIP input signal to gate 160. The black/white video from correlator 102 is applied to an AND gate 162 and through an inverter 164 to an AND gate 166. AND gate 162 also receives the force-black signal from gate 140. AND gate 166 also receives the force-white signal from gate 134. The output of AND gates 162 and 166 are applied to an OR gate 168. The force-black signal and force-white signal are applied to an AND gate 170. The output of AND gate 170 is applied through an inverter 172 to an AND gate 174. AND gate 174 also receives the output of gate 168 to generate the flip signal which is applied to gate 160. The flip signal is generated by either the force-black signal combined with the black/white video signal at gate 162, or the force-white signal combined with the inversion of the black/white video signal at gate 166. The output of gate 168 is inhibited where force-black and force-white are both true, allowing the black/white video to pass through gate 160 unchanged. To summarize, when a BLIND color is detected (core color or valid edge color), the video is forced white or blinded, and when a KEEPER color is detected, the video is forced black. The blind/keep logic 104 performs the following logic:

white video and force-black results in the output flipping to black black video and force-white results in the output flipping to white simultaneous force-black and force-white results in no change in the black/white video; and no force-black or force-white results in no change in the output of the black/white video.

Referring now to FIG. 6, the present document processing system 10 will further be discussed. System 10 includes a microcomputer 200 and an associated input keyboard 202. Interconnected to microcomputer 200 is a bus 204 such as, for example, an IBM PC-AT mother board which provides control, diagnostics and mathematical computations for system 10. Image display 32 and optical character recognition unit 48 are also interconnected to bus 204. While optical character recognition unit 48 is shown attached to bus 204, optical character recognition unit 48 may also be remote. Also interconnected to bus 204 is an interface 206 which may be connected to a host computer or network.

Color scanner/camera 12 is controlled by a scanner control 210. Serial, color, RGB video is applied directly from color scanner/camera 12 to signal conditioner 14 which provides individual cell sensitivity correction and resolution conversion.

The output of signal conditioner 14 is applied to correlator 102, color detection circuit 100, blind/keep logic circuit 104, and image memory 46. The size of image memory 46 is large enough to store a black/white image of an 8.5" by 14" document while the contents of image memory 46 is being transferred to optical character recognition unit 48. Alternatively, the memory may hold a 2" by 2" area of an RGB color image for colorimetry.

Document processing system 10 may operate both offline and online. Offline functions include calibration and colorimetry. During the calibration function, microcomputer 200 assists in computing the individual cell correction values and downloads these values to signal conditioner 14. A "white" calibration document is passed by color scanner/camera 12, sampled, and each R, G, and B cell is normalized to 100% of full value. This normalization corrects for cell sensitivity variations, illumination unevenness and lens efficiency. Additionally, this correction normalizes the overall system 10 "illumination" to equal energy white. The illumination normalization is particularly important due to fluorescent illuminators which tend to change color and brightness as they age.

The colorimetry function pertains to sampling the colors to be kept or blinded, and generating the representative clusters and loading these clusters into lookup tables 122 and 124 (FIG. 5). When performing colorimetry the conditioned RGB video from signal conditioner 14 is passed directly to image memory 46. As previously stated, image memory 46 can store about a 2" by 2" square of full color image. The X, Y coordinates of an appropriate color sample must be entered before a document is scanned by color scanner/camera 12. More than one document may be sampled, in an attempt to collect the full range of color variations that can be expected from a single form type.

The samples are analyzed and the center of the core cluster is computed in three dimensional space. A three dimensional color scale based on television YIQ is modified to achieved symmetry about the central black/-gray/white axes. The symmetrical color scale formula is:

$$Y_m = 0.58G + 0.21R + 0.21B \quad (1)$$

$$I_m = R - Y_m \quad (2)$$

$$Q_m = B - Y_m \quad (3)$$

Figure 7:
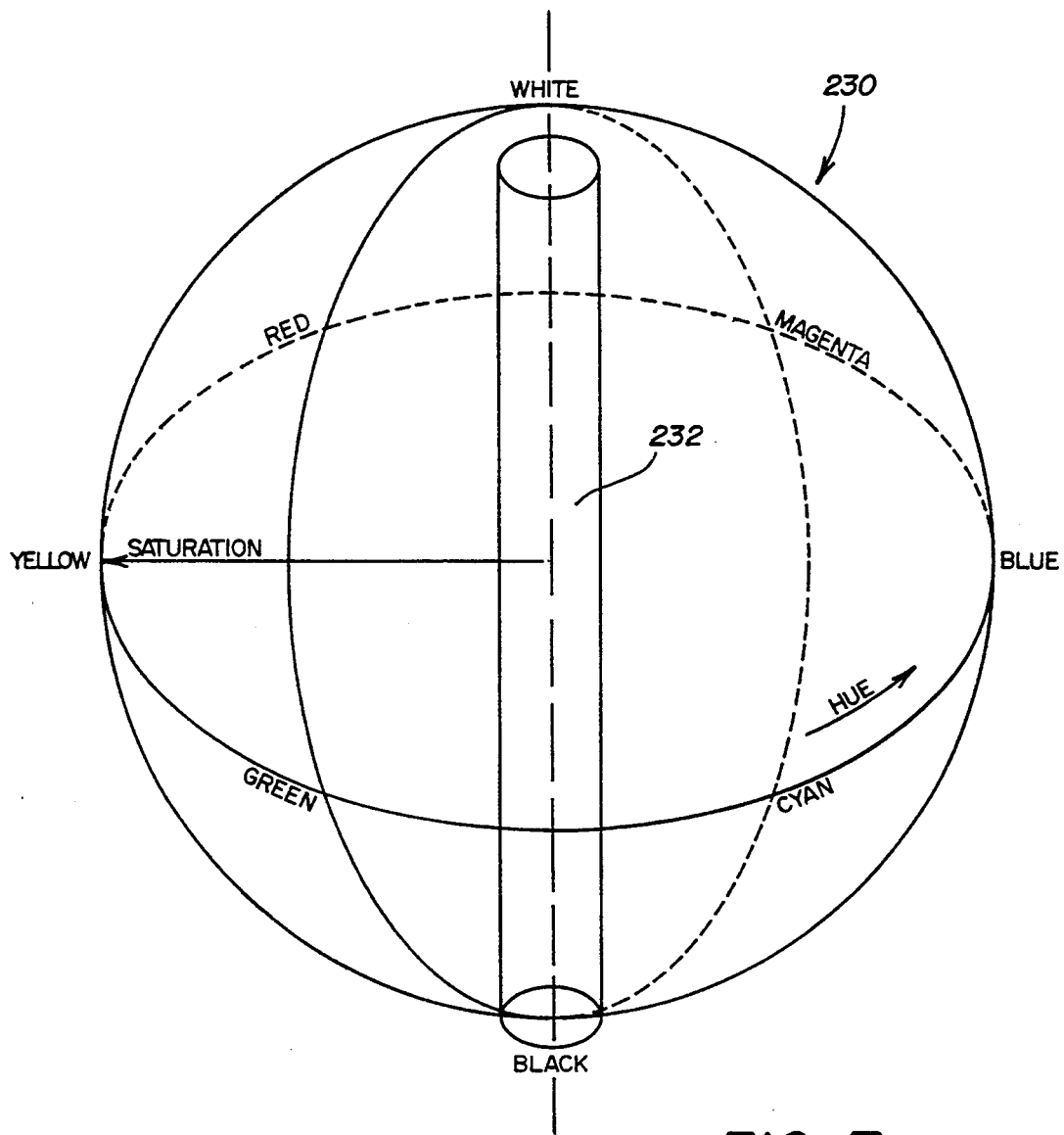
FIG. 7 illustrates a spherical three dimensional color universe that is symmetrical about the gray axis.

Referring now to FIG. 7, an illustration of a spherical three dimensional color universe 230 is illustrated. Color universe 230 is symmetrical about the gray axis. The benefit of the symmetrical color scale is that all hues have the same saturation scale, thus the radius of a gray cylinder 232 can be constant for every hue. The spectral response of $Y_m$ is still approximately photopic. The formulas used for hue ("H") and saturation ("S") are as follows:

$$H = Atan(I_m/Q_m) \quad (4)$$

$$S = sqrt(I_m^2 + Q_m^2) \quad (5)$$

Figure 8:
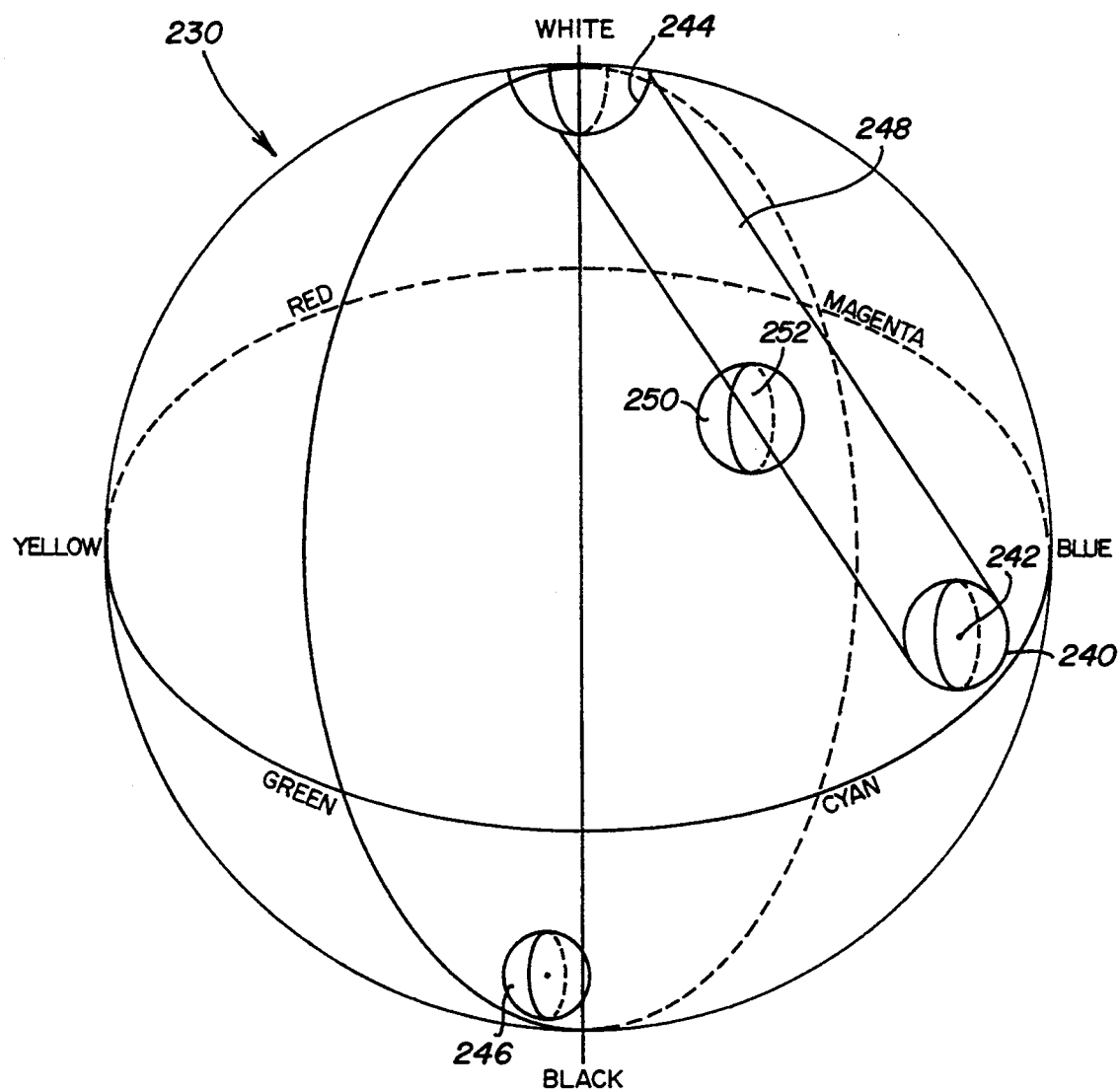
FIG. 8 illustrates a spherical three dimensional color universe showing the core and edge clusters in three dimensional color space.

Referring to FIG. 8, the core cluster 240 is built around the computed center value 242 based on measured deviations in Y, I, Q, H, and S of the color samples coupled to known statistical shapes. This computation prevents "wild" noise values from being included as well as filling in the "holes" left by not having every possible value represented in the color sample. Each of the Y, I, Q, H, and S dimensions of the core cluster are independently expanded to allow for additional tolerances of unseen forms to be processed by the present system 10. The percent expansion will depend on how close contending colors are, and how critical it is to completely blind a color in a given application.

Before creating the edge value clusters, samples of known colors that the core cluster will make transitions to are scanned and analyzed. Normally the transitions would be to a white background 244 or to a dark writing instrument 246. A "tunnel" 248 cluster is built between the blind ink core cluster and the background cluster. Tunnels are built to each of the other colors analyzed. The tunnel cluster is one that will be qualified with the edge function. The tunnel is built concentric with a vector that runs between two cluster centers and butts up to the peripheries of the two expanded core clusters. All the values in the tunnel space are included in the EDGE cluster. The tunnel is cylindrical in Y, I, Q space (rectangular coordinates), but not in H, S, Y space (polar coordinates). Calculations are performed in Y, I, Q and converted to H, S, Y.

The color values in the clusters are converted to R, G, B and loaded into lookup tables 122 and 124 (FIG. 5) as follows:

$$R = I + Y_m \quad (6)$$

$$G = (I + Q) - Y_m \quad (7)$$

$$B = Q + Y \quad (8)$$

This process is performed for each color to be blinded or kept. Contention or overlap of clusters between blind and colors to be kept are checked, and resolved by the system 10 operator before loading lookup tables 122 and 124.

X and Y coordinates of the different color fields are determined and are then entered into the application program with the optical character recognition fields data. Correlator thresholding curves used during the optical character recognition process are also determined and entered into the applications program.

FIG. 8 also illustrates a cluster 250 created by a light blue writing instrument. A portion 252 of this cluster lies within the tunnel 248, and will not be blinded through operation of circuit 100 since this portion represents a valid, solid color (no edge).

For online operation, a batch of forms are loaded into a feeder hopper, and are fed and scanned individually. The video is processed as described above with respect to FIG. 6 with the color detection circuits removing blind colors of the form while preserving writing instrument colors. The resulting image is sent to the optical character recognition unit 48 for conversion to ASCII code. Additionally, microcomputer 200 performs document tracking and controls color enabling/disabling according to vertical position on the document being processed.

In summary, the present invention combines a three dimensional color detection technique with an adaptive correlator/thresholder optimized for character images. The correlator separates the foreground (characters plus form) from the background (paper). The correlator typically forces the background white, and anything with 25% or more contrast with respect to the background is forced black. Combining the two, correlation is performed, then before the color information is discarded, pixel values are tested to determine if they qualify for blinding. If the pixel value does qualify, the correlated pixel is forced white.

The present invention further minimizes the interference between multiplicity of colors produced in the transition between colors, and valid writing instrument colors which may have the same three dimensional color coordinates. The three dimensional sub-space cluster within a three dimensional color universe representing the color to be blinded is separated into multiple clusters. These clusters include the core, a cluster representative of the basic color of the blind ink expanded to allow for expected variations due to printing tolerances, and one or more clusters that represent the transition color values for the ink to be blinded. One of these clusters contains the values of edges from the blind ink to the background color. Another cluster may contain an overall expansion of the core cluster representing edge values to any other color in the color universe. Other specialized clusters may be created when it is known that the blink ink will make transitions to a known color such as a black writing instrument. This specialized cluster contains all the valid edge values between the blind ink and a black pencil or pen.

When a current pixel is found to be in the core cluster it is automatically blinded. If the current pixels falls within one of the edge clusters, the edge detection operator is consulted and if no edge is present, either before or after the pixel, the pixel is considered a valid writing instrument and is not blinded portion 248 of cluster 250 (FIG. 8). Edges of the writing instrument are sacrificed unless the color of the instrument ink is defined as a keeper color.

A further function of the present invention is to provide the ability to designate colors which are to be retained. The same core and edge cluster techniques used for detecting blind inks are used for a "keeper" color. However, as discussed above, when the color is found in one of the keeper clusters, the correlated output is forced black. One keeper cluster that is normally included is the gray cylinder 232 (FIG. 7). This gray cylinder is used as general writing instrument clusters to retain the black inks or pencil marks customarily used for optical character recognition. Alternatively, an opposite use for keeper colors is for blinding forms printed in black ink. In this scenario, a color writing instrument, preferably one with high saturation, is used to fill out the form. The high saturation color is kept and all other markings on the form are blinded. Multiple high saturation keeper colors may also be used. Alternatively, if the black ink on the form is well defined, it can be blinded while all other colors are kept.

The present invention further provides for multiple blind inks and multiple keeper inks which can be selected individually or in various combinations according to program select parameters. A single form may have, for example, three blind inks representing three different information fields. As long as the three blind inks do not interfere with valid writing instrument colors, these inks may all be active for the whole form. If there is contention with a writing instrument in a particular information field, this contention may be resolved by activating the blink inks, one at a time, according to the X and Y location for the field of that color.

The present system 10 allows for the processing of intermixed forms of different colors. As long as the blind ink colors do not interfere with valid writing instruments, all colors may be active simultaneously. However, where there is interference, the interfering color cluster can be activated and deactivated automatically. Automatic color cluster activation is achieved by sampling an area of color at a predetermined X, Y coordinate on the document, prior to blinding of any markings on the document form. If there is not an appropriate area to sample on the form, then a form is designed to have an are of the blind ink at the top of the form so that form color can be determined prior to any OCR fields. When the document is fed in any orientation, there must be an ink sample on an edge that will be scanned initially. The sample size must be large enough to be located in the presence of position variations due to variations in the mechanical scanner.

Figure 9:
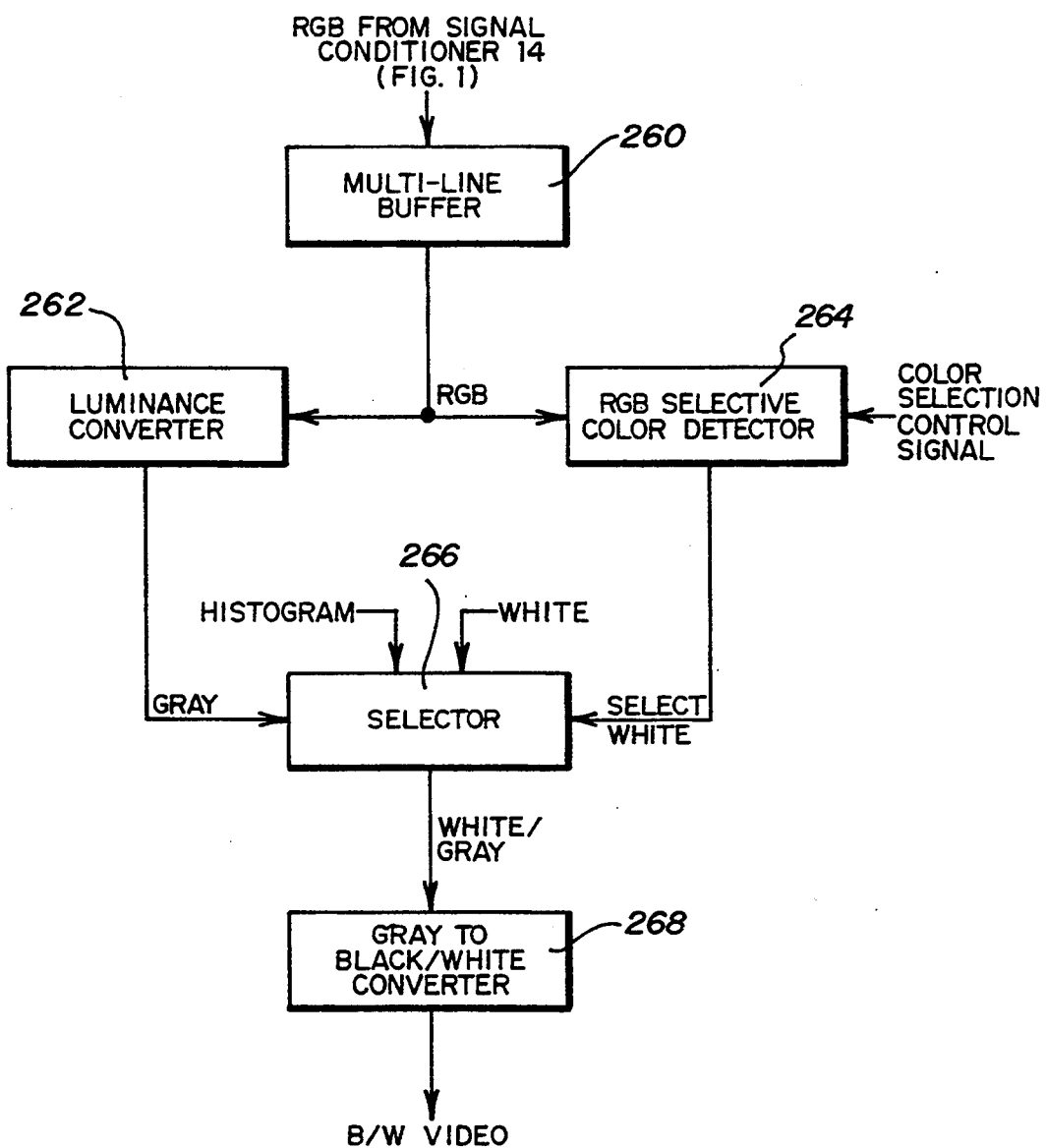
FIG. 9 is a block diagram of a color to black/white converting system in accordance with the present invention.

An alternate approach of the present invention for converting color to black/white data id illustrated in the block diagram of FIG. 9. This conversion takes place in real time. The RGB color components from signal conditioner 14 (FIG. 1) are applied to a multi-line buffer 260. Buffer 260 is continuously updated to store, for example, two or more previous scan lines of video from the document being processed. The RGB output of buffer 260 will feed a luminance converter 262. Luminance converter 262 functions to change the color data to gray scale levels according to, for example, either of the photopic luminance conversion (0.3R+0.11B+0.59G) or the broadband luminance conversion (R+B+G) divided by 3.

The RGB signals also drive a selective color detector 264. Detector 264 functions to produce an output whenever an input pixel matches the color which has been previously defined via the color selection control signal from microcomputer 200 (FIG. 6). The function of color detector 264 is implemented utilizing lookup tables and uses RGB inputs in place of luminance or chrominance coordinates. The output of detector 264 is a binary value that indicates only if a color has been identified.

The output of detector 264 is applied to a selector 266. Selector 266 also receives the gray output from converter 262 and a fixed white level signal which represents the document paper background or the actual background from a running histogram. The fixed white level may be a maximum theoretical white level or a lesser gray scale level. When the white select signal is true, selector 266 will cause the white level to be output, otherwise the picture element gray level from converter 262 will be output.

The output of selector 266 is applied to a gray to black/white converter 268 which generates the black/white signal applied to blind/keep logic 104 and color detection 100 (FIG. 4).

Detector 264 receives color selection control signal from microcomputer 200 (FIG. 6) which may either pass along the control data from an automatic form color selector to be subsequently described with respect to FIG. 10, or which is generated from keyboard 202 (FIG. 6). Colors to be selected by detector 264 can be entered by choosing options offered by system 10 software. Also color parameters can be directly entered through keyboard 202.

Figure 10:
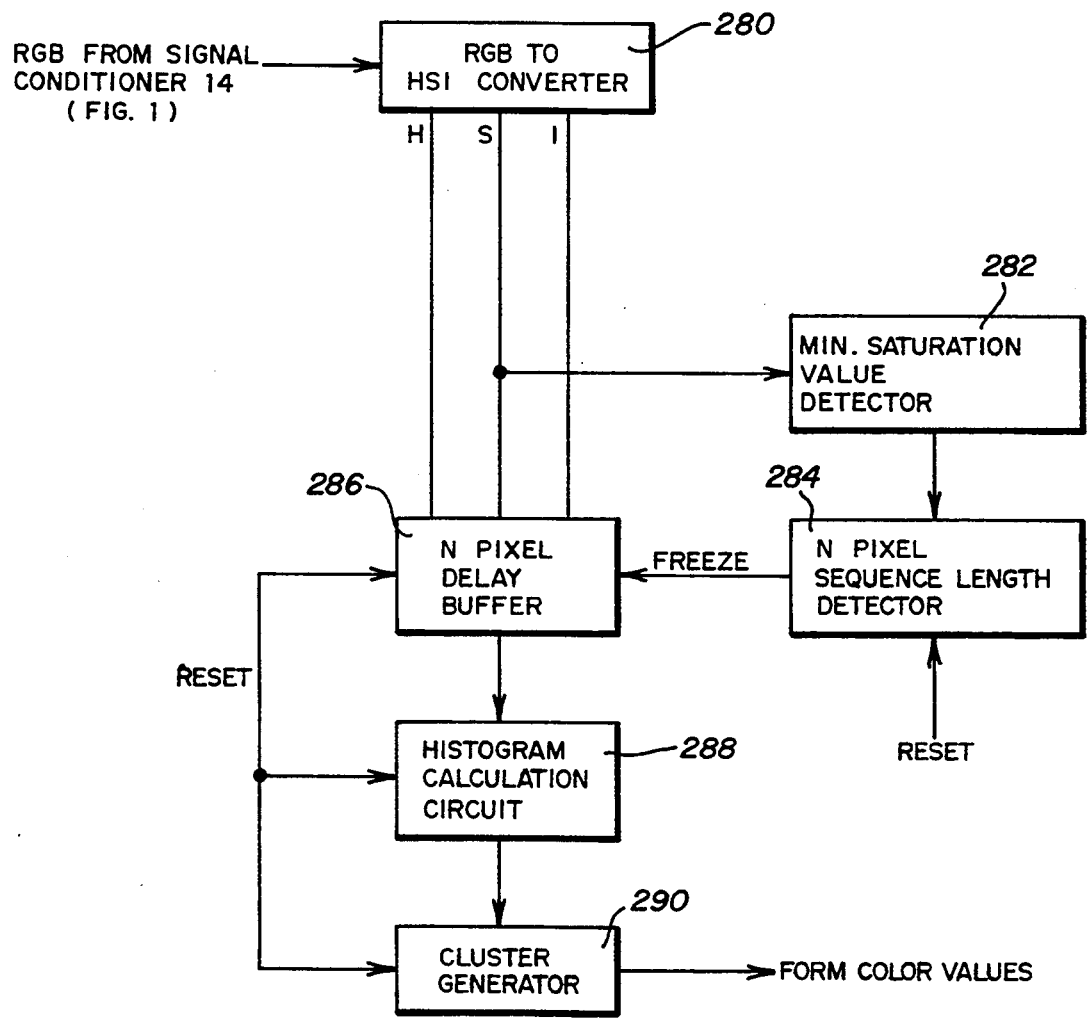
FIG. 10 is a block diagram of a form color detector in accordance with the present invention.

Referring now to FIG. 10, a block diagram of a system for determining whether a document/form being processed is printed in color and to capture the color characteristics for use in blinding that color. The RGB video from signal conditioner 14 (FIG. 1) is applied to a RGB to HSI converter 280. The saturation component of the HSI coordinate system is a measure of intensity of color. All black/white or gray scale images have a saturation value close to 0. The saturation component is applied to a minimum saturation value detector 282 which functions to monitor the magnitude and outputs a logic level for each picture element if a minimum value has been exceeded. The minimum value could be approximately, for example, 10% of the maximum saturation level. The output of detector 282 is applied to a N-pixel sequence length detector 284. Detector 284 measures the number of detected color picture elements in a continuous sequence to determine if the color is produced by a line on the form or by characters to be recognized. For a scanning resolution of 300 points per inch, the pixel count would typically be 100 which represents a line length of ⅓ of an inch.

The output of detector 284 is applied to a N-pixel delay buffer 286. Buffer 286 receives the HSI video and functions as a shift register. The length of buffer 286 is the same as the number of number sequence picture elements required by detector 284. When a "Freeze" output is produced by detector 284, the picture elements that produced the result will be stored in buffer 286. The "Freeze" signal preserves the picture element data stored in buffer 286. The output of buffer 286 is applied to a histogram calculation circuit 288 which functions to analyze the picture element colors stored in buffer 286 to determine the typical color captured. The "Color" output of circuit 288 drives a cluster generator 290 which produces a range of color picture element values that encompass the color of the document form. The output of generator 290, Form Color Values, is one of the inputs to microcomputer 200 which provides an input to detector 264 (FIG. 9). Detector 284, buffer 286, circuit 288, and generator 290 all receive a Reset signal at the beginning of each new document form processed to allow the color of each form to be independently determined. In this way, intermixed forms of different colors can be blinded in accordance with the present invention.

It therefore can be seen that the present system includes a color image processing system for the electronic color filtering of documents including the electronic selection and removal of blind inks, or other interference from documents. Multiple colors are designated for either blinding or retaining. Clusters of colors are determined such that all interfering marks including the edges thereof are blinded or retained as desired.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A document processing system for processing documents having data printed thereon including markings having an interior core area bounded by an edge, the markings having a hue and visible to the eye, but are not to be read by the system and the data includes characters which are to be read by the system comprising:
    means for scanning a document and for generating a plurality of colored picture elements;
    means for identifying colors included within the core area and edge of the markings;
    means for converting the colors of the picture elements of the core area and edge of the markings to a color of the background of the document thereby generating a filtered image of the document;
    means for subtracting a percentage of the hue that is complementary to the hue of the markings from the hue of the markings, such that the background surrounding a character is detected by said optical character recognition means as the colors of the markings; and
    optical character recognition means for receiving said filtered image of the document representing character information only and for identifying the characters appearing on the document from said filtered image, such that the markings and the background surrounding a character are not distinguishable by said optical character recognition means.

2. The document processing system of claim 1 wherein said color converting means includes:
    means for converting said plurality of colored picture elements into a corresponding plurality of gray scale picture elements;
    means for correlating said plurality of gray scale picture elements to generate a black or white picture element representation for each of said plurality of said gray scale picture elements; and
    means for converting said black or white picture element representations based upon the colors of said markings, such that black picture elements in the core area and edge of a marking are converted to white picture elements and white picture elements of the characters are converted to black picture elements.

3. The document processing system of claim 1 wherein said color identifying means includes:
    means for identifying the colors of the markings from said generated colored picture elements.

4. The document processing system of claim 1 wherein said color identifying means includes:
    means for selectively identifying a color of markings to be filtered.

5. The document processing system of claim 1 wherein said color identifying means includes:

means for identifying a plurality of colors on the document representing a plurality of different markings to be filtered.

6. The document processing system of claim 1 and further including:

means for detecting the edge of a marking.

7. A document processing system for processing documents having data printed thereon including colored markings having a hue and visible to the eye, but which are not to be read by the system, and characters having a color which are to be read by the system comprising:

means for scanning a document and for generating a plurality of colored picture elements;

means for identifying the color of the characters appearing on the document;

means for converting all colors of markings appearing on the document to a color of the background of the document except for said identified color of characters appearing on the document, thereby generating a filtered image of the document;

optical character recognition means for receiving said filtered image of the document representing character information only and for identifying characters appearing on the document from said filtered image, such that the markings and the background surrounding a character are not distinguishable by said optical character recognition means; and said means for converting including means for subtracting a percentage of the hue that is complementary to the hue of the markings from the hue to the markings, such that the background surrounding a character is detected by said optical character recognition means as the colors of the markings.

8. The document processing system of claim 7 wherein said means for identifying the color of characters appearing on the document includes:

means for identifying the color of characters from said colored picture elements.

9. The document processing system of claim 7 wherein said means for identifying the color of characters appearing on the document includes:

means for selectively identifying a character color to be maintained and not filtered.

10. The document processing system of claim 7 wherein said color converting means includes:

means for converting said plurality of colored picture elements into a corresponding plurality of gray scale picture elements;

means for correlating said plurality of gray scale picture elements to generate a black or white picture element representation for each of said plurality of gray scale picture elements; and means for converting all of said picture elements to a white representation except for picture elements of the characters appearing on the document.

11. A method for processing documents having data printed thereon including markings having an interior core area bounded by an edge, the markings having a hue and visible to the eye, but which are not to be read by the system and the data includes characters which are to be read by the system comprising the steps of:

scanning a document and generating a plurality of colored picture elements;

identifying colors included within the core area and edge of the markings;

converting the colors of the picture elements of the core area and edge of the markings to a color of the background of the document thereby generating a filtered image of the document;

subtracting a percentage of the hue that is complementary to the hue of the markings from the hue of the markings, such that the background surrounding a character is detected by said optical character recognition means as the colors of the markings; and identifying the characters appearing on the document from the filtered image.

12. The method of claim 11 wherein the color converting step includes:

converting the plurality of colored picture elements into a corresponding plurality of gray scale picture elements;

correlating the plurality of gray scale picture elements to generate a black or white picture element representation for each of the plurality of the gray scale picture elements; and converting the black or white picture element representations based upon the colors of said markings, such that black picture elements in the core area and edge of a marking are converted to white picture elements and white picture elements of the characters are converted to black picture elements.

13. The method of claim 11 wherein the color identifying step includes:

identifying the colors of the markings from the generated colored picture elements.

14. The method of claim 11 wherein the color identifying step includes:

selectively identifying a color of markings to be filtered.

15. The method of claim 11 wherein the color identifying step includes:

identifying a plurality of colors on the document representing a plurality of different markings to be filtered.

16. The method of claim 11 and further including the step of:

detecting the edge of a marking.

17. A method for processing documents having data printed thereon including colored markings having a hue and visible to the eye, but which are not to be read by the system, and characters having a color which are to be read by the system comprising the steps of:

scanning a document and generating a plurality of colored picture elements;

identifying the color of the characters appearing on the document;

converting all colors of markings appearing on the document to a color of the background of the document except for the identified color of characters appearing on the document, thereby generating a filtered image of the document by subtracting a percentage of the hue that is complementary to the hue of the markings from the hue of the markings; and identifying characters appearing on the document from the filtered image.

18. The method of claim 17 wherein the step of identifying the color of characters appearing on the document includes:

identifying the color of characters from said generated colored picture elements.

19. The method of claim 17 wherein the step of identifying the color of characters appearing on the document includes:

selectively identifying a character color to be maintained and not filtered.

20. The method of claim 17 wherein said color converting step includes:

converting the plurality of colored picture elements into a corresponding plurality of gray scale picture elements;

correlating the plurality of gray scale picture elements to generate a black or white picture element representation for each of the plurality of gray scale picture elements; and converting all of the picture elements to a white representation except for picture elements of the characters appearing on the document.

* * * * *

UNITED STATES PATENT AND TRADEMARK OFFICE
CERTIFICATE OF CORRECTION

PATENT NO. : 5,335,292

DATED : August 2, 1994

INVENTOR(S) : Kenneth T. Lovelady, et al.

It is certified that error appears in the above-identified patent and that said Letters Patent is hereby corrected as shown below:

```
Column 8, line 13, following "the" and preceding
          "pre-printed", insert -- present document
          processing system 10.  Document 52 includes --.
```

Signed and Sealed this

Thirty-first Day of January, 1995

Attest:

BRUCE LEHMAN

*Attesting Officer*    *Commissioner of Patents and Trademarks*